Jan. 20, 1953  R. R. BARBER  2,626,093
APPARATUS FOR HANDLING MATERIALS
Filed June 29, 1950  2 SHEETS—SHEET 1

INVENTOR
R. R. BARBER
BY
ATTORNEY

Patented Jan. 20, 1953

2,626,093

UNITED STATES PATENT OFFICE 2,626,093

APPARATUS FOR HANDLING MATERIALS

Robert R. Barber, Idlewylde, Md., assignor to Western Electric Company, Incorporated, New York, N. Y., a corporation of New York Application June 29, 1950, Serial No. 171,000

5 Claims. (Cl. 226—19)

This invention relates to apparatus for handling materials, and more particularly to apparatus for funnelling materials into containers and weighing accurately the materials.

An object of the invention is to provide new and improved apparatus for handling materials.

A further object of the invention is to provide new and improved apparatus for funnelling materials into containers and weighing accurately the materials.

Another object of the invention is to provide apparatus for placing mechanically a funnel into a container on a scale and for releasing the funnel to permit taring only the funnel with the container.

An apparatus illustrating certain features of the invention may include a scale, a container positioned on the scale, a funnel designed to engage the container and supportable thereby, and means for moving the funnel into engagement with the container and releasing the funnel to permit it to be tared with the container.

A complete understanding of the invention may be obtained from the following detailed description of an apparatus forming a specific embodiment thereof, when read in conjunction with the appended drawings, in which.

Figures 1, 4:
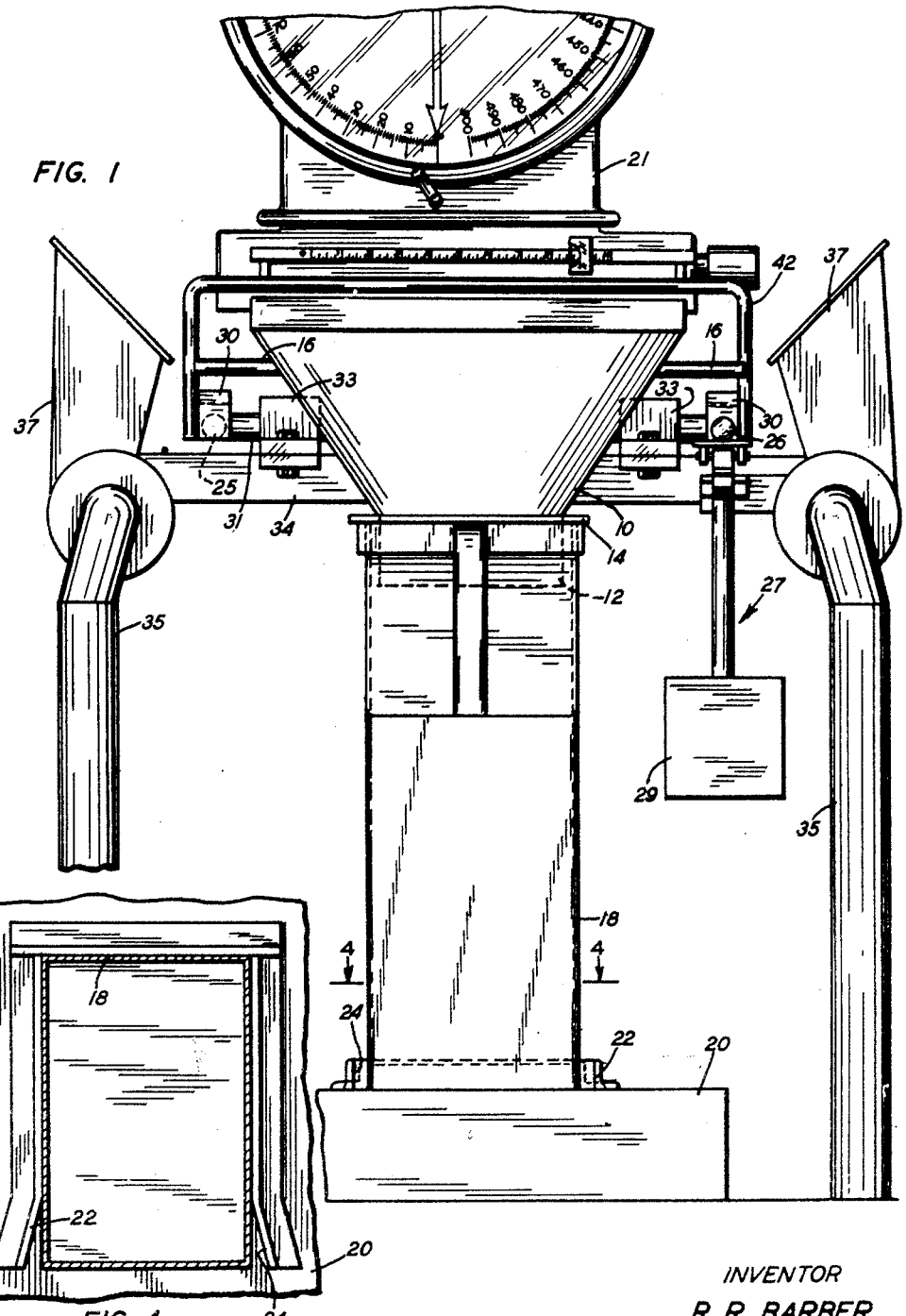
Fig. 1 is a fragmentary, front elevation of an apparatus forming one embodiment of the invention.
Fig. 4 is a fragmentary, horizontal section taken along line 4—4 of Fig. 1.
Figure 2:
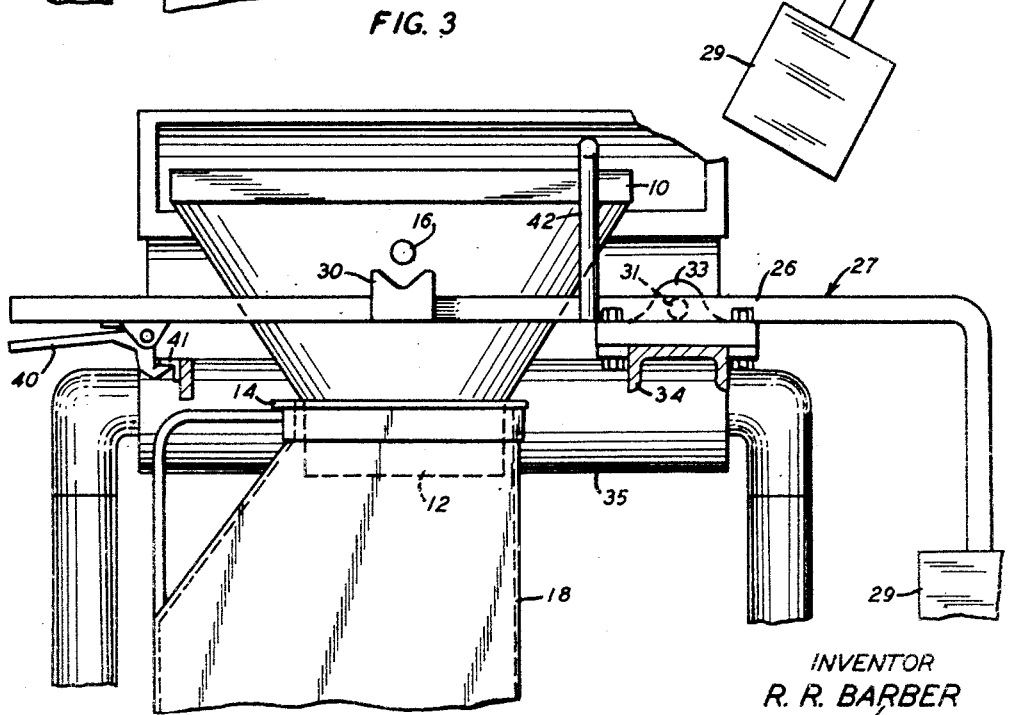
Fig. 2 is a fragmentary, side elevation of a portion of the apparatus shown in Fig. 1.

Referring now in detail to the drawings, a funnel 10 (Fig. 1) includes a spout 12, a flange 14 and a pair of support rods 16—16. The funnel is shown in Figs. 1 and 2 in a delivery position with respect to a container 18 located on a scale platform 20 of a scale 21 by a U-shaped guide 22 (Fig. 4) fixed to the platform. The guide 22 has a tapered entrance portion 24 to facilitate guiding the container into proper position for receiving the funnel, in which position the container is inserted into the guide as far as possible.

Arms 25 and 26 of a yoke 27 having a counterweight 29 secured thereto support notched holders 30—30. The yoke includes a rod 31 connecting the arms 25 and 26 rigidly together, and is mounted rotatably in bearings 33—33 supported by a channel 34. The channel is supported independently of the scale platform 20 by side frames 35—35, which also support exhaust ducts 37—37.

Figure 3:
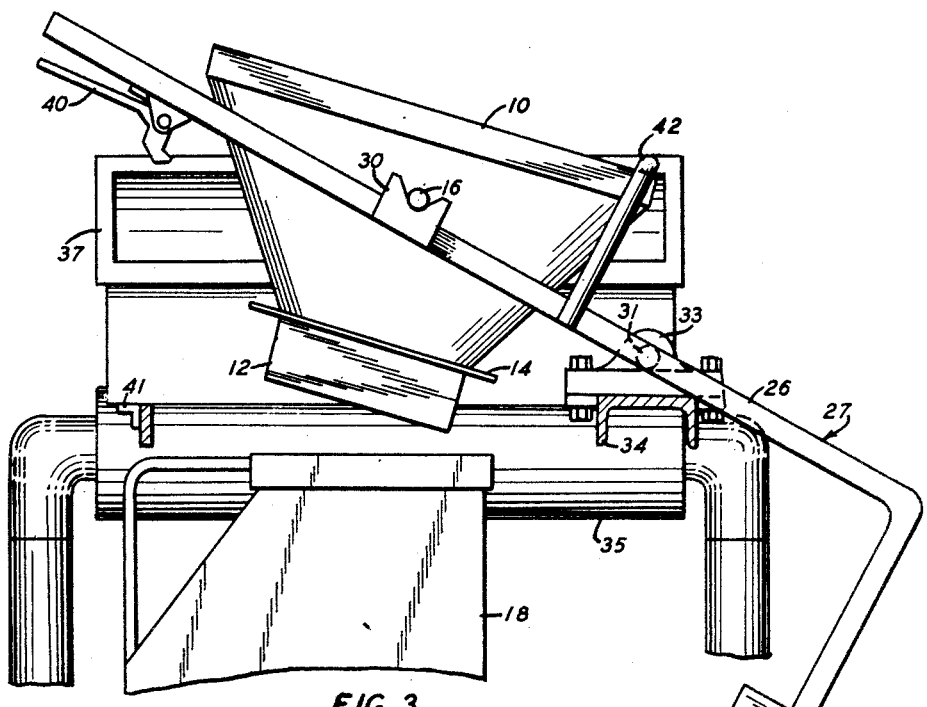
Fig. 3 is a view similar to Fig. 2 showing elements of the apparatus in positions different from those shown in Fig. 2.

A manually operable latching arm 40 mounted on the arm 26 is designed to engage an angle iron 41 supported by the frames 35—35. When the latching arm engages the angle iron, they hold the yoke 27 and the elements carried thereby in the positions thereof shown in Fig. 2 against the action of the counterweight 29, which normally holds the yoke and the funnel in retracted positions thereof shown in Fig. 3. A U-shaped rod 42 secured to the arms 25 and 26 holds the funnel 10 in such a position when the spout is moved toward the container that the spout enters the container without interference therefrom. When the funnel is in its delivery position and the yoke 27 is in its latched position, the rod 42 and the holders 30—30 are completely out of contact with the funnel.

Operation

The container 18 is slid to a position abutting the back of the U-shaped guide 22. The yoke 27 is swung from its position shown in Fig. 3 to its position shown in Fig. 2, and is latched in the latter position. As the yoke is so swung, the U-shaped rod 42 guides the spout 12 of the funnel 10 into the container 18 until the flange 14 on the funnel engages the container. The notched holders 30—30 move out of contact with the support rods 16—16, and the rod 42 is swung away from the funnel.

With the funnel 10 supported solely by the container 18, these elements are tared, powdered material of one kind is poured into the funnel until a predetermined net weight is reached, and other materials are supplied to the funnel and weighed one at a time. After the last material has been added and weighed, the funnel is shaken to discharge any of the powdered materials sticking thereto into the container. The latching arm 40 is released, and the counterweight 29 swings the yoke 27 and the funnel in a clockwise direction, as viewed in Fig. 2, until the arm 26 strikes the channel 34. This moves the funnel completely out of engagement with the container, which is removed. The above-described material weighing operation then may be repeated with a second container.

The above-described apparatus serves to accurately locate the container, and places the funnel in proper filling position merely by swinging the yoke 27. The yoke facilitates swinging the funnel to and from pouring position, and

What is claimed is:

1. A funnelling device, which comprises a yoke mounted pivotally and having upwardly facing notches in the arms thereof, a funnel having elements projecting into the notches, means normally biasing the yoke and the funnel to predetermined positions, a container, means for supporting the container in a position under the funnel such that as the yoke is pivoted against the action of the yoke-biasing means the funnel is moved toward the container and the yoke is moved out of engagement with the funnel, means for latching the yoke in a position out of engagement with the funnel, and means carried by the yoke for guiding the funnel to a pouring position with respect to the container.

2. A funnelling device, which comprises a container, means for locating the container in a predetermined position, a funnel having a spout designed to enter the container and a flange designed to support the funnel on the container, a pivotally mounted funnel support, lost motion means connecting the funnel to the support, means normally biasing the funnel support and the container to predetermined positions in which the funnel is completely above the container, the funnel support and lost motion connecting means being actuable to swing the funnel into a pouring position on the container and to move out of contact with the funnel, and means for latching the funnel support and the lost motion connecting means out of contact with the funnel.

3. A weighing device, which comprises a scale including a platform, a yoke mounted pivotally and independently of the scale platform, said yoke having upwardly facing notches in the arms thereof, a funnel having elements projecting into the notches and a spout, a container, means normally biasing the yoke to a predetermined position, a U-shaped rod secured to the yoke for tilting the container when the yoke is in said position, means for supporting a container in a position on the scale platform under the funnel such that as the yoke is pivoted against the action of the yoke-biasing means the funnel is moved into a pouring position on the container and the yoke and the rod are moved out of engagement with the funnel, and means for latching the yoke and the rod in positions out of engagement with the funnel.

4. A weighing device, which comprises a scale having a platform designed to support in a predetermined position a rigid container having an open top, a funnel designed to fit into the open top of the container and be supported thereby, and a pivotally mounted yoke movable into engagement with the funnel for arcuately moving and guiding the funnel from a position in which it is clear of the container to a position in which it is supported by the container and movable out of engagement with the funnel to allow it to be wholly supported by the container.

5. A weighing device, which comprises a scale having a platform designed to support in a predetermined position a rigid container having an open top, a funnel designed to fit into the open top of the container and be supported thereby, a pivotally mounted yoke movable into engagement with the funnel for arcuately moving and guiding the funnel from a position in which it is clear of the container to a position in which it is supported by the container and movable out of engagement with the funnel to allow it to be wholly supported by the container, a counterbalance secured to the yoke for urging it into engagement with the funnel, and means for latching the yoke out of engagement with the funnel.

ROBERT R. BARBER.

REFERENCES CITED

The following references are of record in the file of this patent:

UNITED STATES PATENTS

| Number | Name | Date |
|---|---|---|
| 617,961 | Johnson | Jan. 17, 1899 |
| 811,653 | Moseley | Feb. 6, 1906 |
| 2,086,416 | Howard | July 6, 1937 |
| 2,524,243 | Wicklund | Oct. 3, 1950 |